United States Patent Office 3,299,697
Patented Jan. 24, 1967

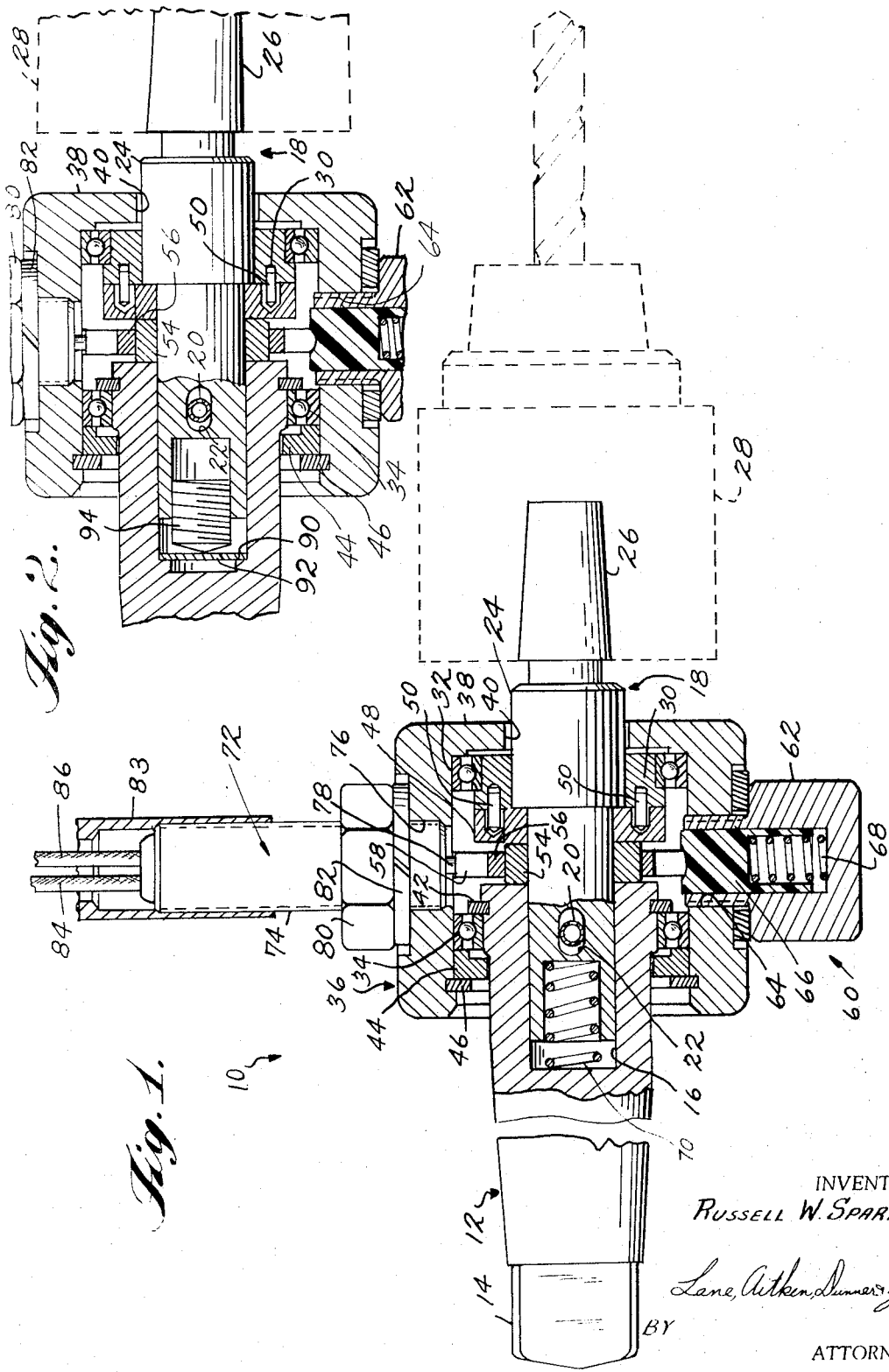

3,299,697
TOOL CONDITION DETECTOR
Russell W. Sparling, West Warwick, R.I., assignor to Taco, Inc., Cranston, R.I., a corporation of New York
Filed Sept. 20, 1963, Ser. No. 310,220
12 Claims. (Cl. 73—104)

The present invention relates to detectors for detecting the condition of cutting tools, and more particularly to a detector which can be used to detect broken or dull cutting tools.

In many types of automatic machine tools it is very important to know when a cutting tool such as a drill, tap, ream or the like, breaks so that the machine tool can be shut down immediately to prevent damage. It is also very desirable to know when a cutting tool is dull so that it can be sharpened or replaced. This latter information is particularly useful in connection with larger cutting tools, such as drills over ¼" in diameter, which often become too dull for use without breaking.

Accordingly, it is one object of the invention to automatically detect the condition of a cutting tool as it is cutting, and to produce an output signal indicating the condition of the tool.

It is another object of the invention to provide a simple, economical and reliable detector for automatically detecting a broken cutting tool.

It is a further object of the invention to provide a simple, economical and reliable detector for automatically detecting a dull cutting tool.

It is a still further object of the invention to provide a detector which can be used for detecting a broken cutting tool and also can be used for detecting a dull cutting tool by making a simple adjustment or modification of the detector.

It is a still further object of the invention to provide a detector which detects the condition of a cutting tool by sensing the reactive force on the cutting tool while it is cutting.

It is a still further object of the invention to provide a detector of the type described having a rotatable element which is made to rotate with the cutting tool when the reactive force thereon reaches a predetermined value, and wherein the detector includes a sensing device for sensing the rotation of the rotatable element and producing an output signal to indicate the element is rotating.

It is a still further object of the invention to provide a detector of the type described above which also serves as an adaptor for mounting a cutting tool on a machine tool and produces a suitable electrical output signal when the reactive force on the cutting tool reaches a predetermined value.

Other objects and features of novelty of the present invention will be specifically pointed out or will otherwise become apparent when referring, for a better understanding of the invention, to the following description taken in conjunction with the accompanying drawings, wherein:

FIG. 1 is a broken sectional view of one embodiment of the present invention; and FIG. 2 is a fragmentary sectional view of a portion of the structure of FIG. 1 illustrating a modification of the the invention.

Referring to FIG. 1 a detector 10 is shown which illustrates one embodiment of the present invention. It comprises a first shaft 12 having a shank 14 on one end for mounting the shaft on the spindle of a machine tool. The other end of the shaft 12 has a bore 16 for slidably receiving the end of a second shaft 18. The two shafts are slidably keyed together by a pin 20 which is fixed to the shaft 12 and extends through an axially extending slot 22 in the shaft 18 to permit limited sliding movement between the shafts.

The shaft 18 has an enlarged cylindrical portion 24 between the ends thereof, and a tapered end portion 26 adapted to support a chuck 28 which in turn supports a suitable cutting tool such as a drill, tap, or the like. The chuck and cutting tool are shown in phantom in FIG. 1. A sintered bronze bushing 30 is slidably mounted on the enlarged cylindrical portion 24, and the inner race of a ball bearing 32 is press fit on the bushing 30. The inner race of a second ball bearing 34 is press fit on the end of the shaft 12 and a cylindrical housing 36 is press fit on the outer races of the ball bearings 32 and 34 so as to be rotatably supported on the shafts 12 and 18. The housing 36 has an end wall 38 on one end thereof with a central opening 40 therein closely overlying the enlarged cylindrical portion 24 of the shaft to close off one end of the housing. The outer race of the ball bearing 32 abuts against an internal annular shoulder on the end wall 38 and the inner end of the inner race abuts against a suitable shoulder on the bearing bushing 30. One end of the inner race of the ball bearing 34 abuts against a suitable snap ring 42 fixed on the shaft 12 and the other end of the outer race abuts against a cover ring 44 which in turn abuts against a snap ring 46 fixed on the housing 36. A washer-shaped thrust plate 48 is fixed on the shaft 18 against the end of the enlarged cylindrical portion 24 for rotation therewith and is drivingly connected to the bushing 30, such as by a plurality of dowel pins 50, or the like.

With this construction the bushing 30 will be rotatably driven by the thrust plate 48 so as to drive the inner race of the ball bearing 32 with the shaft 18 while permitting the shaft and thrust plate 48 to freely slide axially in one direction relative to the bushing 30.

A sintered bronze thrust washer 54 is rotatably journalled on the shaft 18 between the end of the shaft 12 and the thrust plate 48. A gear 56 having a plurality of teeth 58 is fixed on the thrust washer 54 for rotation therewith. The gear 56 is normally prevented from rotating relative to the housing 36 by a brake mechanism 60. The brake mechanism comprises a knob 62 threadably mounted in an internally threaded opening 64 in the cylindrical wall of the housing 36. A plunger 66 made of a suitable low friction material, such as a tough plastic material sold under the tradename of Delrin, is slidably mounted within the knob 62 and is spring biased against the teeth 58 of the gear 56 by a suitable spring 68 or the like.

A spring 70 is interposed between the shafts 12 and 18 to continuously bias them apart. Consequently the shaft 18 urges the thrust plate 48 against the face of the bushing 30 which prevents further movement in this direction since the ball bearing 32 acts as a thrust bearing also. Similarly, the snap ring 42 on the end of the shaft 12 is pressed against the inner race of the ball bearing 34 which also acts as a thrust bearing to limit axial movement in this direction. The thrust plate 48, thrust washer 54 and end of the shaft 12 are very accurately machined so that in this position the thrust plate and end of the shaft 12 barely touch the thrust washer 54 and exert little if any axial compressive force on the thrust washer 54. Therefore, when the shaft 12 is rotated by the machine tool and the housing 36 is held against rotation, as will be described, the brake mechanism 60 exerts a sufficient force on the teeth of the gear 56 to prevent the gear and thrust washer 54 from rotating with the shafts. However, as the machine tool axially advances the rotating cutting tool through a workpiece to perform a cutting operation, a reactive force is exerted on the shafts 18 and 12 tending to compress the spring 70. As soon as the compressive force acting on the thrust washer 54 increases sufficiently to overcome the braking force applied by the brake mechanism 60, the gear 56 will begin to rotate with the shafts 18 and 12. Thus, by controlling the spring force applied by the spring 70, the gear 56 can be made to start rotating when a predetermined reactive force is exerted on the shafts.

A suitable sensing device 72, such as an electromagnetic pickup, can be mounted on the housing 36 in position to detect rotation of the gear 56. The sensing device illustrated has an externally threaded housing 74 threadably engaged in an internally threaded opening 76 in the cylindrical wall of the housing. Magnetic pole faces 78 project from the end of the sensing device with the air gap therebetween overlying the gear teeth 58. A nut 80 and split washer 82 are provided for locking the housing 74 against movement after the pole faces have been properly positioned. A torque arm 83 is mounted on and extends from the end of the sensing device to provide a suitable means for holding the housing 36 against rotation without interfering with axial movement of the housing.

With this arrangement the reluctance of the air gap between the pole faces is reduced each time a gear tooth passes through the air gap. Suitable electric leads 84 and 86 are connected to the coil of the electromagnet and project from the end of the sensing device. Rotation of the gear teeth past the air gap between the pole faces generates an A.C. current in the coil of the electromagnet to produce a signal indicating that the gear 56 is rotating. This signal may be used in any desired manner, such as to control an alarm signal, a control panel light or to shut down the machine.

If the detector 10 is used to detect broken drills, for example, the spring force of the spring 70 need only be great enough to insure that the gear 56 does not rotate when the rotating drill is not cutting, i.e., no reactive force present. As soon as the drill starts cutting the reactive force produced will urge the thrust plate 48 against the thrust washer 54 to start the gear rotating. This rotation is sensed by the sensing device 72 which produces an output signal to indicate that the drill is cutting properly. Should the drill break, the gear 56 will stop rotating since the reactive force is no longer present, and the sensing device 72 will provide a signal to indicate that the drill is broken.

If the detector 10 is to be used as a dull tool detector rather than a broken drill detector, a heavier duty spring 70 can be used so that when a sharp drill is cutting the reactive force produced thereby will not be sufficient to overcome the spring force to cause the gear 56 to start rotating. However, as the tool wears the reactive force increases and a point will be reached when the reactive force is great enough to overcome the spring force to cause the gear 56 to start rotating. The sensing device 72 will then produce a signal to indicate that the drill is dull. By carefully selecting the spring force applied by the spring 70, the sensing device can be made to produce an output signal at any predetermined reactive force. If desired, an adjustment may be provided for varying the spring force exerted by the spring 70 to control the reactive force at which the gear 56 starts rotating. Of course, adjusting the knob 62 to control the braking force exerted by the brake mechanism 60 will also influence the size of the reactive force required to start the gear rotating. But it is preferred to adjust the brake mechanism to exert just enough force on the gear to insure that it doesn't rotate with the drill when it is not cutting.

Referring to FIG. 2 a modification of the invention is illustrated wherein a fairly rigid metal disk 92 is substituted for the spring 70. The disk 92 is seated on an annular shoulder 90 provided on the inner end of the bore 16 in the shaft 12. A set screw 94 is threadably mounted on the end of the shaft 18 so that its axial position may be adjusted. The outer end of the set screw 94 is cone shaped so that it engages the metal disk 92 only at the center thereof. The adjustment of the set screw is such that the shafts 12 and 18 are urged apart from one another so that the thrust plate 48 does not exert enough of a force on the thrust washer 54 to cause it to rotate with the shafts 12 and 18. It is apparent that this force need only be a small force and, therefore, the ball bearings 34 and 36 do not have a large thrust exerted thereon. When the drill is cutting, it exerts a reactive force as before which is resisted by the metal disk 92 so that the gear 56 does not rotate. However as the tool gets duller and the reactive force increases, a point is reached at which the metal disk will deflect or give enough despite its rigidity to enable the thrust plate 48 to exert enough pressure on the thrust washer 54 to start the gear 56 rotating and thus produce an output signal from the sensing device 72 to indicate that the tool is dull and should be replaced.

By using the metal disk in place of the spring 70 the initial preload that must be imposed on the shafts to bias them apart can be greatly reduced to reduce the thrust applied to the ball bearings 32 and 34. Also the exact point at which the gear starts rotating can be very accurately predetermined to provide a precise and reliable indication of a dull cutting tool.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A detector for detecting the condition of a rotary cutting tool comprising support means for supporting a rotary cutting tool on one end thereof with the other end thereof adapted to be mounted on a machine tool, a rotatable element mounted on said support means for rotation relative thereto through 360 degrees, clutch means responsive to axial thrust on said cutting tool for drivingly connecting said rotatable element to said support means for rotation therewith only when a predetermined reactive force is exerted on said support means during a cutting operation, and sensing means for sensing rotation of said rotatable element.

2. A detector for detecting the condition of a rotary cutting tool comprising a first member adapted to be mounted on a machine tool for rotation and axial advancement thereby, a second tool supporting member mounted on said first member for rotation therewith and limited axial movement relative thereto, a rotatable element rotatably mounted on one of said members for rotation relative thereto through 360 degrees, clutch means on said members for engaging said rotatable element when the members are urged axially toward one another in response to a predetermined axial reactive force on the cutting tool so as to cause said element to rotate with said members, and sensing means for sensing rotation of said rotatable element.

3. The invention as defined in claim 2 including means for continuously biasing said members axially away from one another to a first normal position, and brake means for preventing rotation of said rotatable element with said members when the members are in said normal position.

4. A detector for detecting the condition of a cutting tool comprising a first shaft, a second shaft mounted on said first shaft for rotation therewith and limited axial movement relative thereto, one of said shafts being adapted to rotate said cutting tool a rotatable element mounted on one of said shafts for rotation relative thereto, brake means frictionally engaging said rotatable element to normally prevent rotation thereof with said shafts, clutch means on said shafts for engaging said rotatable element with a force sufficient to overcome said brake means and cause the rotatable element to rotate with the shafts when the shafts are urged toward one another in response to a reactive force on the cutting tool, and sensing means for sensing rotation of said rotatable element.

5. The invention as defined in claim 4 including means for continuously biasing said shafts apart from one another.

6. The invention as defined in claim 5 wherein said biasing means exerts a predetermined biasing force large enough to prevent said rotatable element from rotating with said shafts until a predetermined reactive force is exerted on the shafts by the cutting tool.

7. A detector for detecting the condition of a cutting tool comprising a first shaft, a second shaft mounted on said first shaft for rotation therewith and limited axial movement relative thereto, a rotatable element rotatably mounted on said second shaft in position to have one face abut against the end of said first shaft, a thrust plate fixed on said second shaft for rotation therewith and in position to abut against the other face of said rotatable element, biasing means continuously urging said shafts apart from one another, brake means frictionally engaging said rotatable element to normally prevent rotation thereof with said shafts, and sensing means for sensing rotation of said rotatable element whereby the thrust plate and end of the first shaft will frictionally engage the faces of the rotatable element when the shafts are urged toward one another by a reactive force large enough to overcome the biasing means and brake means to rotate said element with the shafts.

8. The invention as defined in claim 7 including means for adjusting the biasing force of said biasing means.

9. The invention as defined in claim 7 wherein said biasing means comprises a spring interposed between said shafts.

10. The invention as denfined in claim 7 wherein said biasing means comprises a rigid disc interposed between said shafts with one of the shafts engaging the periphery of said disc and the other of said shafts contacting said disc near the center thereof.

11. A detector for detecting the condition of a cutting tool comprising a first shaft adapted to be attached to a machine tool for rotation therewith and axial advancement thereby, a second tool supporting shaft slidably keyed to said first shaft for rotation therewith and limited axial movement relative thereto, an element rotatatably mounted on said second shaft in position to have one face thereof engage a radial thrust face on said first shaft, a thrust plate fixed on said second shaft for rotation therewith in position to have one face thereof engage the other face of said element, a bearing driver slidably and rotatably mounted on said second shaft in position to engage the other face of said thrust plate, means for slidably keying said bearing driver to said thrust plate for rotation therewith and axial sliding movement relative thereto, a first ball bearing having the inner race thereof fixed to said bearing driver, a second ball bearing having the inner race thereof fixed to said first shaft, a cylindrical housing extending over said ball bearings for enclosing said bearing driver, thrust plate and element, said housing being fixed to the outer races of said ball bearing, biasing means for normally biasing said shafts axially apart from one another, brake means mounted on said housing and frictionally engaging said element, and sensing means mounted on said housing in position to sense rotation of the element whereby when a compressive reactive force is exerted on said shafts to urge them toward one another with a sufficient force to overcome said brake means and biasing means, the thrust plate and radial face of said first shaft will frictionally grip said element therebetween to cause it to rotate and said sensing means will sense the rotation of said element.

12. The invention as defined in claim 11 wherein said rotatable element comprises a gear having magnetic permeable teeth and said sensing means comprises an electromagnetic pickup which generates an A.C. current signal in response to the rotation of the magnetic permeable teeth therepast.

References Cited by the Examiner

UNITED STATES PATENTS 2,375,991   5/1945   Hoffar _____ 77—32.7 X
2,774,261  12/1956   Leibing.
3,208,311   9/1965   Pierce.

RICHARD C. QUEISSER, *Primary Examiner.*

JULIUS FISHER, *Assistant Examiner.*